United States Patent [19]

von Glanstätten et al.

[11] Patent Number: 4,620,569

[45] Date of Patent: Nov. 4, 1986

[54] FLEXIBLE ARMORED SYNTHETIC RESIN HOSE, MORE SPECIALLY FOR SHOWERS

[75] Inventors: Thassilo A. F. von Glanstätten, Wasserburg/Inn; Eugen H. Stahl, Böttingen, both of Fed. Rep. of Germany

[73] Assignee: Hans Grohe GmbH & Co. KG, Fed. Rep. of Germany

[21] Appl. No.: 572,296

[22] Filed: Jan. 20, 1984

Related U.S. Application Data

[63] Continuation of Ser. No. 260,675, May 5, 1981, abandoned.

[30] Foreign Application Priority Data

May 6, 1980 [DE] Fed. Rep. of Germany ....... 3017326
May 14, 1980 [DE] Fed. Rep. of Germany ....... 3018417

[51] Int. Cl.[4] ............................................. F16L 11/08
[52] U.S. Cl. ................................... 138/132; 138/121; 138/129; 138/144
[58] Field of Search ............... 138/121, 122, 129, 132, 138/133, 138

[56] References Cited

U.S. PATENT DOCUMENTS

| 2,688,343 | 9/1954 | Cuddeback | 138/133 |
| 3,006,381 | 10/1961 | Rothermel et al. | 138/122 |
| 3,058,493 | 10/1962 | Muller | 138/133 |
| 3,091,261 | 5/1963 | Waddell, Jr. | 138/122 |
| 3,329,172 | 7/1967 | Osborn | 138/122 |
| 4,172,474 | 10/1979 | Stahl | 138/132 |
| 4,224,463 | 9/1980 | Koerber et al. | 138/122 X |

FOREIGN PATENT DOCUMENTS

| 203300 | 10/1958 | Austria . |
| 1228468 | 11/1966 | Fed. Rep. of Germany . |
| 2261126 | 8/1974 | Fed. Rep. of Germany . |
| 2722928 | 11/1978 | Fed. Rep. of Germany . |
| 1308575 | 10/1962 | France . |
| 2013627 | 4/1970 | France . |
| 2356869 | 1/1978 | France . |

Primary Examiner—James E. Bryant, III
Attorney, Agent, or Firm—Steele Gould & Fried

[57] ABSTRACT

A flexible armored synthetic resin hose for showers, with an extruded inner hose part of thermoplastic or elastomeric material, an extruded outer hose part of thermoplastic or elastomeric material, which is at least partly supported so as to be spaced from the inner hose part, and a reinforcement helix for armoring the hose, said helix being placed between said inner and an outer hose parts.

18 Claims, 5 Drawing Figures

FLEXIBLE ARMORED SYNTHETIC RESIN HOSE, MORE SPECIALLY FOR SHOWERS

CROSS REFERENCE TO RELATED APPLICATION

This application is a continuation of Ser. No. 260,675, filed May 5, 1981, now abandoned.

BACKGROUND OF THE INVENTION

1. Field of the Invention

The present invention is with respect to a flexible armored synthetic resin hose, more specifically for showers, with an extruded inner hose part of thermoplastic or elastomeric material, an extruded outer hose part of thermoplastic or elastomeric material, which is at least partly supported so as to be spaced from the inner hose part, and a reinforcement helix for armoring the hose, said helix being placed between said inner and said outer hose parts.

2. Prior Art

In an earlier design of flexible synthetic resin hose (see German Pat. No. 2,261,126) a wire helix of round cross-section and made of metal or a hard synthetic resin is placed round an inner hose part of plasticised polyvinyl chloride ("PVC") without however being joined with the inner hose part. Between the coils of the wire helix a thin hard PVC band is coiled which is markedly broader than the thickness of the wire of the wire helix. This coiled hard PVC band is joined not only with the inner hose part but furthermore with the outer hose part along its full length, it having the purpose of making certain that the inner hose part is not inwardly buckled on bending the hose sharply and for this reason decresing the flow cross-section within the hose. Such a hose is however somewhat stiff because the hard PVC band, which together with the inner hose part and the outer hose part takes the form of a generally thick compound body, may not be readily bent. For this reason, on bending that part, of the outer hose part placed on the wire helix is forced together to a high degree and outwardly buckled on the side of the hose with the smaller radius so that the material is acted upon by high forces.

In a further earlier design of flexible synthetic resin hose (see German Offenlegungsschrift specification No. 2,722,928), a flexible reinforcement band of relatively hard synthetic resin is coiled about the inner hose part and strongly joined with it and with the outer hose part, that is to say with the outer part, by reinforcement lips running outward therefrom in a radial direction and running round the structure, such lips at the same time fixing the spacing between the outer and inner hose parts. In the case of this flexible hose part the space between the coils of the reinforcement helix is free so that the hose has good bending properties. However it has now turned out that the flexibility of the hose might be made even better for general use. Furthermore there have been shortcomings in connection with adhesively joining the hard synthetic resin with the plastizised synthetic resin of the hose parts.

SUMMARY OF THE INVENTION

In view of this, one purpose of the present invention is that of designing a pressure hose, more specially for showers, which with respect to flexiblity is better than earlier synthetic resin hose designs and is furthermore free of signs of wear even after long times of use.

The present invention is characterized in that the reinforcement helix is covered by a helix-like hose round it, said helix-like hose being joined not only with the inner hose part but furthermore with the outer hose part. The covering is best made of a generally soft plastic or elastomeric material and is more specially transparent. For producing the connection, the covering is best welded and/or adhesively joined to the inner and outer hose parts.

The covering of the generally hard reinforcement helix is responsible for useful effects on producing the hose and furthermore the use thereof. On the helix it is for example possible, before it is covered, to put a metallized foil or metal foil so that the hose, when designed for showers and having a metal casing may be given the desired look. By covering the structure with soft synthetic resin such a metal coating is safeguarded against damaging effects. The key-function of the covering of the reinforcement helix is to be seen in that, because of covering, a strong adhesive bond between the outer and inner hose parts is produced, such a bond being very much better than on making any attempt at directly bonding or joining the reinforcement helix, which may for example be made of polyamide, polyester, polyurethane and more specially hard PVC or polypropylene, with the outer and inner hose parts. Furthermore the covering, which more specially is designed so that there is no sticking to the reinforcement helix, may be elastically changed in form on stretching of the outer and/or inner hose parts without such stretching being stopped by the hard reinforcement helix. Because of this, the flexibility of the hose is very much increased and at the same time in the case of the hose of the present invention it is possible to make certain, because the covered reinforcement helix takes the form as well of the connection element between the inner and outer hose parts, that the spaces between the coils of the reinforcement helix are kept free so that, when the hose is bent, the coils of the reinforcement helix may be pushed together at the inner side of the bend of the hose. On the other hand this inbetween space of the present hose may furthermore be made smaller than the breadth of the reinforcement helix and more specially so as to be equal to about ⅓ to ⅔ of the breadth of the helix so that the metallization of the helix will be more clearly seen because of the smaller helix lead, the hose then, to the eye, having quite the same look as a metal hose.

The reinforcement helix is best made in the form of a flat strip with a generally rectangular to oval cross-section, the flat sides being turned inwards and outwards towards the inner hose and outer hose parts. If there is not adhesive bond between the reinforcement helix and its covering, there will be a chance of the covering moving slippingly along the helix so that any stresses, produced on twisting the hose, may be taken up and it will not be possible for the connection between the covering and the inner and outer hose parts to be broken.

The flexibility of the hose of the present invention may be increased in the case of one working example if the radial spacing or distance between the inner and outer hose parts between the coils of the reinforcement helix is made smaller by decreasing the diameter of the outer hose part and/or increasing the diameter of the inner hose part, such motion of the inner and outer hose parts so as to be nearer together being able to be produced in a number of different ways, for example by the use of a pressure on molding the material of the outer hose part onto the reinforced inner hose part, the degree to which they are moved together being controlled by the pressure level. The distance between the inner and outer hose parts may even be decreased to such a degree that the two hose parts are in contact between the coils of the reinforcement helix and may even be joined together permanently at these positions.

In the case of a preferred working example of the invention the inner hose part is made of rubber, such rubber being more specially resistant to hot water so that one may be certain of troublefree use of the hose, while on the other hand, because the inner hose part of rubber is very elastic, the hose will be able to be stretched and there will be elastic recovery, that is to say when not acted upon by the stretching force, the hose will go back to the length it had in the first place. Furthermore the flexibility of the hose will be increased while at the same time when it is sharply bent there will be less stressing of the material, because such bending is made more readily possible by the stretch property of the rubber at the outside of the bend. If the inner hose part is made of rubber, then because of its higher flexibility the covering of the reinforcement helix may furthermore be made to be generally flexible or so as to be adhesively fixed to the reinforcement helix.

Because rubber is less well able to be joined to a soft thermoplastic synthetic resin (as for example plasticized PVC) than synthetic resins are able to be joined together, the outer face of the rubber is best conditioned with an adhesion adjuvant for producing a strong bond with the covering of the reinforcement helix. The adhesion adjuvant may be put on in strips or in a helix in line with the general form of the reinforcement helix touching the inner hose part, but however as a general rule, the full face of material will be conditioned with adjuvant. Such an adhesion adjuvant may well be an elastomeric adhesive compound, as for example one based on polyurethane, although it is furthermore possible for the full rubber inner hose part to be coated with a thin layer of soft synthetic resin in addition to, or in place of, an adhesive compound, such a soft synthetic resin best being the same sort of synthetic resin as is used for making the covering of the reinforcement helix and in this way a very strong bond may be produced between the covering of the reinforcement helix and the inner hose part.

The hose of the present invention may furthermore usefully be reinforced in the axial direction by threads generally running in the axial direction and positioned between the inner hose part and the reinforcement helix, such threads being more specially flexible multifilament threads which however may not be stretched and which are placed flatly against the inner hose part. They may furthermore be within synthetic resin bands or ribbons, for example made of PVC (polyvinyl chloride), for example by being worked into them or by being coated with them. If the inner hose part is made of rubber, the axial reinforcement threads are then best made longer than the inner hose part in the stress-free condition, so that it is possible for the hose to be made elastic in the length direction while having a reinforcement in the same direction, stretch in the length direction being clearly limited by the length of the threads. For making certain of stretch properties, the reinforcement threads are not placed completely straight on the inner hose part but in such a manner that they may still be "stretched", that is to say pulled out straight. To this end the threads may be placed in zig-zag form and/or with outwardly running folds on the inner hose part. The lengthways elasticity of the hose, which may be in a range between 5% and 100%, is for this reason best limited to about 10 to 20%, this being great enough for most cases. Because of the lengthways elasticity of the hose, it is possible for the spacing between the coils of the helix furthermore to be kept less than one half or one third of the breadth of the reinforcement band, this nevertheless making certain of good flexibility. It is even possible for the separate coils of the helix to be placed right against each other. As a rule 6 to 24, or more specially, 8 to 20 reinforcement threads will be present.

The present invention is furthermore with respect to a process for making the pressure hose in the case of which the inner hose part has coiled round it a monofilament reinforcement band (which may be metallized if desired) in the form of a helix and after this an outer hose part is extruded over the reinforcement helix so formed. The process is characterized in that a flexible reinforcement band of hard synthetic resin is covered with a soft synthetic resin, which is molded onto it, the so-covered reinforcement band is coiled onto the inner hose part and the covering of the reinforcement band is joined with the inner and outer hose parts. The best material for covering the reinforcement band is a material which, using adhesion adjuvants if desired, may be strongly joined to the inner and outer hose parts so that the reinforcement band is fixedly positioned in the hose and a strong bond is produced between the inner and outer hose parts. The inner hose part is best coated, before it has the covered reinforcement band coiled onto it, with an adhesive, more specially an elastic one. This will more specially be the case when the inner hose part, as part of a preferred working example of the invention, is an elastomeric hose, more specially a rubber hose. The inner hose part may have the reinforcement band coiled on it while the hose part is in a stretched condition, the degree of stretch being best about 5 to 20%, so that such coiling-on may take place with a generally large lead or pitch, the lead then being decreased again on the hose's springing back on elastic recovery. In this way it becomes possible for the separate coils of the helix to be placed very near each other or it will even be possible for them to be pulled up against each other by a spring force.

If for axial reinforcement threads are used joined to the inner hose part, such threads will best be put in place when the inner hose part is stretched by 5 to 100% and more specially 10 to 20%. The axial reinforcement threads may be adhesively joined, at least at separate points, in the case of one working example of the invention.

More specially in those cases in which the inner hose part is a hose of elastomeric material it may be useful for the inner hose part to have extruded or molded round it a casing of thermoplastic material for radially stabilizing the structure and for producing a better bond with the reinforcement helix and, if desired, the outer hose part, such a casing being made of thermoplastic material and best having elastic properties so that it may be moved with the rest of the rubber hose. Before extruding the inner hose part it may be coated with adhesion adjuvant as for example an adhesive. The extruding of plasticized thermoplastic synthetic resin round the inner hose part is best undertaken in the unstretched condition of the inner hose part. On extruding the material of the outer hose part round the inner hose part, having the reinforcement helix thereon, the outer hose part may be stretched to a greater or lesser degree so that the properties of the hose may be changed as desired. Furthermore it is possible for the form of the spaces between the separate coils of the reinforcement helix to be changed by producing different pressure conditions at the extruding head when the material of the outer hose part is being extruded, it being possible, by using a gauge pressure produced from the outside, to make certain that still-soft synthetic resin material is formed inbetween the coils of the helix, at least in part, radially inwards.

In the case of a preferred working example of the invention the face, turned towards the outer hose part, of the covering has a special outline in cross-section, that is to say is not simply round and smooth, such an outline having for example lips running along edges, so that the joining face between the outer hose part and the covering is limited to the outer side or top side of the outline of the covering, this stepping up the flexibility of the hose part, because the outer hose part is then still able to be bent and elastically changed in form even at the position in which it is joined with the covering.

More specially in the case of a hose for showers the ends thereof may well be capped by end sleeves or end fittings. Such end sleeves may be specially strongly fixed in position if the lead or pitch of the reinforcement helix is made smaller at the hose ends, and is more specially decreased to zero, that is to say so that the separate coils of the helix will be touching each other.

The inner hose part may, if desired, have a thin coating of soft synthetic resin extruded or molded onto it, possible after conditioning with an adhesive, and before having the reinforcement band coiled onto it, such soft synthetic resin best having elastic properties. In this way it is simpler for the reinforcement helix to be fixed on the inner hose part. Such extruding of the synthetic resin is best undertaken when the inner hose part is generally not in a stretched condition.

BRIEF DESCRIPTION OF THE DRAWING

Further details and useful effects of the invention will be seen from the account now to be given of preferred working examples to be seen in the figures and in the claims.

DETAILED DESCRIPTION OF THE PREFERRED EMBODIMENTS

Figure 1:
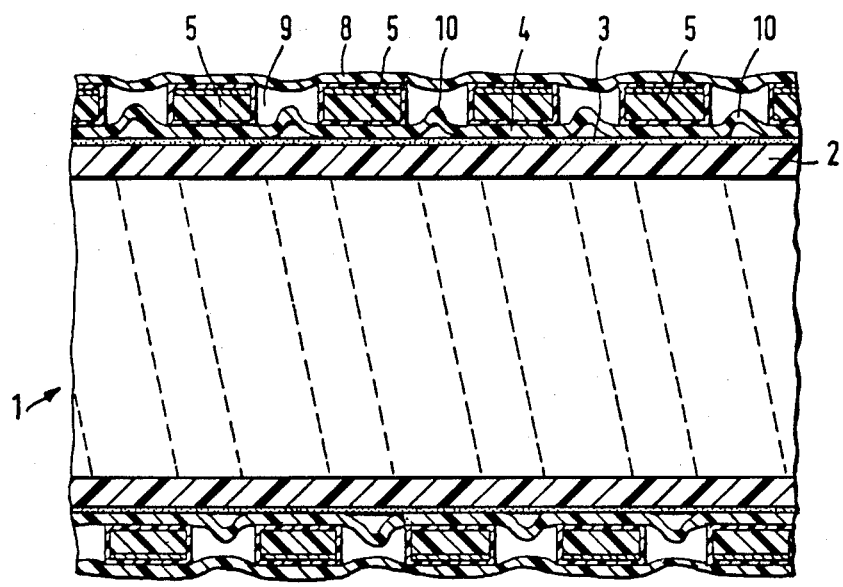
FIG. 1 is a lengthways section through a first working example of the invention.
Figure 2:
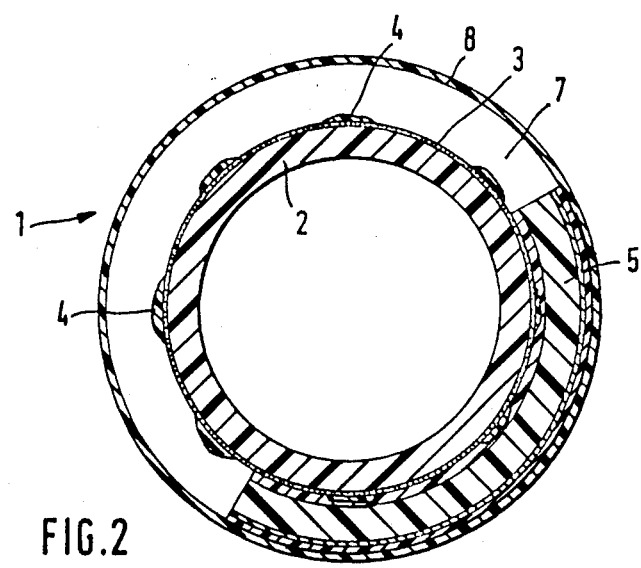
FIG. 2 is a cross-section through the working example of FIG. 1.
Figure 3:
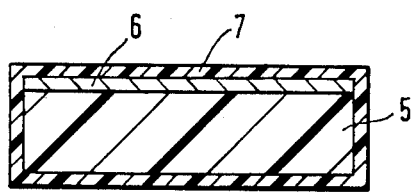
FIG. 3 is a cross-section through the covered reinforcement helix of FIG. 1 on a larger scale.

The working example of the invention to be seen in FIGS. 1 to 3 takes the form of a two-walled shower hose 1, whose inner hose part 2 is made of neoprene which has an inner diameter of about 8 mm and a wall thickness of about 1 mm. The inner hose part 2 has on its outer face a coating 3 of an elastomeric adhesive on which multifilament reinforcement threads 4 are placed flatly so as to running in a generally axial direction.

The reinforcement helix 5 is coiled on to the inner hose part armored with the reinforcement threads, the helix 5 stabilizing the inner hose part 2 radially as desired. The reinforcement helix 5 is made of hard PVC (polyvinyl chloride) and has a rectangular or oval cross-section, a thickness of about 0.5 to 1 mm and a breadth of about 3 to 4 mm. The reinforcement helix 5 has, on its outer face, a thin metal foil or a metallized synthetic resin foil 6 made for example of polyester for giving the hose the desired metal look. The reinforcement helix 5, together with the metallized foil, has a coating of soft PVC extruded or molded round it for producing a hose structure with a thickness of 0.1 to 0.4 mm, such outer structure being tightly fixed on and round the reinforcement helix but however not sticking thereto. This covering 7 on the helix 5 may be slipped along the helix to some degree, when acted upon by forces, more specially when the covering is stretched in the cross-wise direction on bending hose 1.

The covered reinforcement helix 5 is used as a connection element for producing a connection between the inner hose part 2 and an extruded outer hose part 8 of soft PVC (polyvinyl chloride) or soft vinyl, the flat connection being produced between the covering 7 and the inner hose part 2 by way of adhesive coating 3, while on the other hand the covering 7 is welded to the outer hose part 8. The lead (or pitch) of the reinforcement helix 5 is about 1½ to 1¾ times the breadth of the reinforcement helix 5 so that the space 9 between any two coils of the reinforcement helix is smaller than the breadth of the reinforcement helix 5. In this space between the coils the outer hose part 8 is pulled in somewhat so as to become smaller in diameter. In other respects the inbetween space, but for radially outwardly running folds 10 of the axial reinforcement threads 4, is hollow and free of any other filling or reinforcement parts.

The axial reinforcement threads 4 are about 10% longer than the rubber hose part 2 in the stress-free condition, such threads running on hose part 2 in a somewhat wavy or zig-zag line and/or forming folds 10 running out into hollow space 9 so as to make possible a desired, limited stretching of hose 1 because they are able to be pulled out straight but, once pulled out straight, they have the effect of stopping any further stretching of the hose. Because of this design the overall shower hose has a high degree of flexibilityl, which is increased by the bellow-like folds of decreased diameter in the outer hose part, such folds running into the spaces 9 between the coils of reinforcement helix 5. Even with the small ratio between the lead to the breadth of the reinforcement helix 5, that is to say even with the narrow spaces between the coils of the helix, truly round bending in the form of a circle of hose 1 with a radius of 30 mm and even less is possible.

Figure 4:
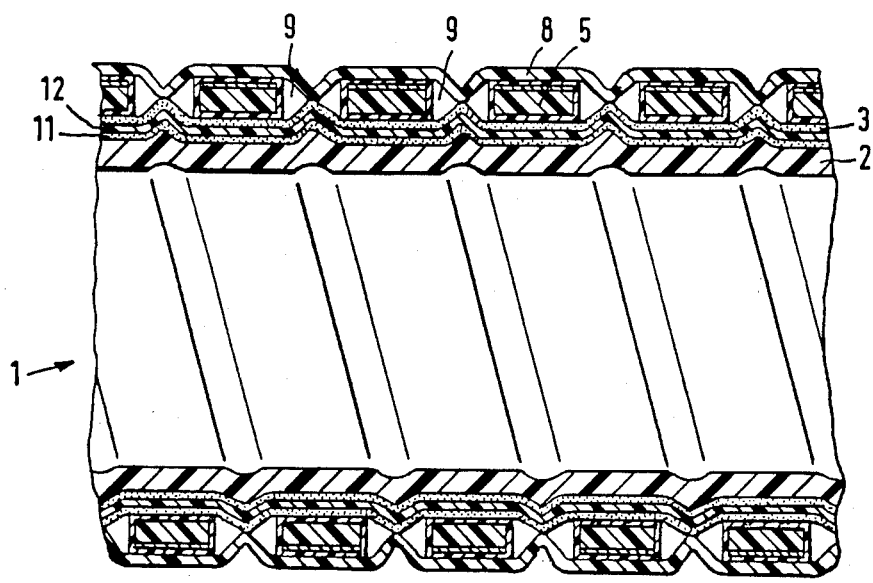
FIG. 4 is a cross-section through a further working example of the invention.

In the working example of the invention of FIG. 4 parts which are the same as parts in FIGS. 1 to 3 are marked with the same part numbers. In this further working example the rubber inner hose part, made of neoprene as well, has a further covering on its outer face, such covering being made up of an adhesive coating 11 all over the hose part, of elastomeric adhesive, and a thin coating 12, extruded onto the rubber hose, of soft PVC, for which the adhesive 11 is used as an adhesion adjuvant, it having a wall thickness of about 0.1 to 0.5 mm. Because this soft inbetween coating 12 placed all over the rubber hose part, the adhesive coating 11 is responsible for a strong bond and will not be pulled off even after the hose has been bent and stretched a large number of times in use. On the outside of the soft PVC inbetween layer there is again, as in the first working example, an adhesive coating 3 for producing a strong and complete bond between the covering 7 of reinforcement helix 5 and the soft PVC inbetween coating 12. Due not only to the covering 7, but the inbetween layer 12 as well being made of soft PVC, there is no need, in this case, for the adhesive coating 3, the bond and connection between the covering 4 and the PVC inbetween layer 12 then being able to be produced by welding or by using a solvent for the synthetic resins.

The working example of FIG. 4 is different however with respect to a further detail than working example of FIG. 1. As shown in FIG. 4, the parts of the rubber hose inner part 2 with the soft PVC (polyvinyl chloride) coating thereon, briding over the spaces 9 between the coils of reinforcement helix 5, are radially curved outwards. On the other side the outer hose part 8 is so forced into the spaces 9 between the coils of the reinforcement helix with the forming of parts of smaller diameter or folds, that the outer hose part 8 is in contact with the inner hose part 2 and the soft PVC (polyvinyl chloride) coating 12 thereon so as to make a permanent bond therewith. For this reason the inner and outer hose parts take the form of oppositely running waved structures responsible for a very high level of flexibility of the hose, which may readily be bent. If desired, axially running reinforcement threads may be used in this working example of the invention as well.

Figure 5:
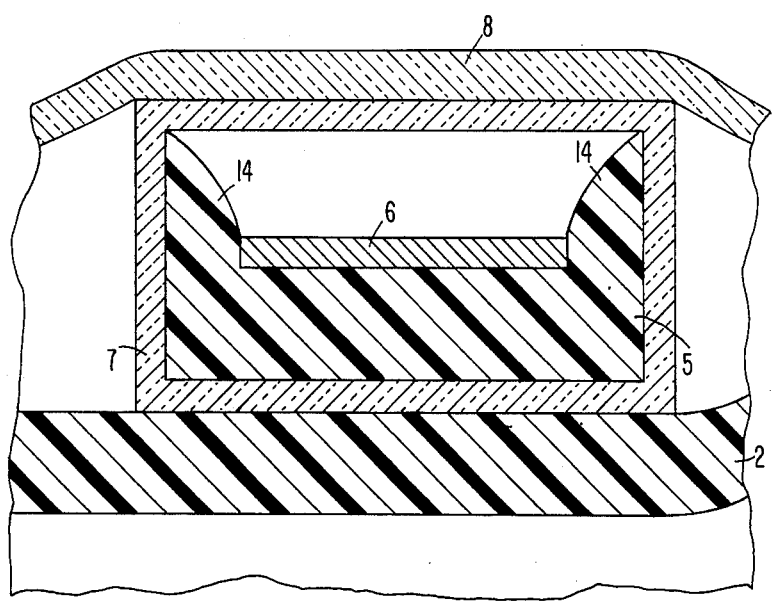
FIG. 5 is a cross-section through yet another working example.

FIG. 5 illustrates a re-enforcement helix 5 having a special outer face having lips 14 running outwardly therefrom in a radial direction around the structure.

The invention is however not limited to the working examples noted and a number of different changes may be made without giving up the general framework of the invention; for example the spacing between one coil and the next one of the reinforcement helix may be made so large that there is a large-area connection between the outer hose part with the smooth inner hose part, this structure having an outer hose part which is meandering when seen in lengthways section. This is possible if on extruding the material of the outer hose part round the inner hose part with the reinforcement helix enough pressure is used for forcing the outer hose part tightly against the helix and the inner hose part.

On the other hand a high level of elasticity in the lengthways direction may be produced by coiling the covered reinforcement helix 5 onto the inner hose part 2 with a small lead, that is to say the distance between the separate turns or coils of the helix, so that, in the stress-free condition of the rubber hose, such spaces are only about one half or even less of the the breadth of the reinforcement helix in size. The outer hose part may then be produced and extruded under a moderate pressure with the inner hose part stretched so that, when the structure is freed of stress, the outer hose part is then folded like a bellows and with V-like cross-section of the folds in an inward direction. If the hose is now stretched, the outer hose part will be pulled out and freed of the bellows-like folds so that it becomes smooth and free of folds without any high degree of stretch of the outer hose part being necessary. The same thing takes place on bending the hose at the outer side of a bend. It is furthermore possible for the outer hose part to be produced from a thermoplastic synthetic resin in place of rubber, a special adhesive coating on the outer side of the inner hose part then being unnecessary, if the inner hose part is as well made of soft synthetic resin as for example plasticized PVC (polyvinyl chloride) and in this case, for example, it will be enough for the covered reinforcement helix and the inner hose part to be joined together by wetting then with a solvent so that their contacting faces are somewhat dissolved and joined with each other. However a shower hose with an inner hose part of soft PVC is less resistant to hot water than such a hose with an inner hose part of rubber.

We claim:

1. A flexible armored synthetic resin hose for showers and the like, comprising:
    an extruded inner hose part of flexible material;
    an extruded outer hose part of soft plastic material, the outer hose part being supported in spaced relationship from the inner hose part;
    a single reinforcement helix for armoring the hose, said reinforcement helix being placed between said inner hose part and said outer hose part; and,
    a helix-like hose of soft plastic material enclosing the reinforcement helix and defining a range of movement for the reinforcement helix therein, said helix-like hose being joined to the inner hose part and to the outer hose part to maintain the spaced relationship, the reinforcement helix being freely slippingly positioned within the helix-like hose, and free to slip relative to the helix-like hose and relative to the inner hose part and to the outer hose part, and wherein a free space is defined between adjacent coils of the reinforcement helix.

2. A hose as claimed in claim 1, wherein the helix-like hose is soft polyvinyl chloride.

3. A hose as claimed in claim 1, wherein the inner hose part is made of rubber resistant to hot water.

4. A hose as claimed in claim 1, wherein the reinforcement helix has a specially shaped outer face turned towards the outer hose part having lip-like parts running along the edges thereof.

5. A hose a claimed in claim 1, wherein the helix-like hose enclosing the reinforcement helix is adhesively joined to at least one of the inner and outer hose parts.

6. A hose as claimed in claim 1, further comprising an adhesive adjuvant between the outer side of the inner hose part and the helix-like hose enclosing the reinforcement helix.

7. A hose as claimed in claim 6, wherein the adhesion adjuvant is formed by a coating of at least one of an elastic adhesive and a soft synthetic resin applied to the inner hose part.

8. A hose as claimed in claim 1, wherein the inner hose part has flexible, stretch-resistant reinforcement threads generally running in an axial direction and resting on the outer face of the inner hose part, such threads being at least partly joined with the outer face of the inner hose part.

9. A hose as claimed in claim 8, wherein the reinforcement threads are longer than a corresponding portion of the inner hose part, the reinforcement threads limiting elongation of the inner hose part when the inner hose part is axially stretched.

10. The hose of claim 1, wherein the inner hose part is made of elastomeric material.

11. The hose of claim 1, wherein the inner hose part is made of soft plastic material.

12. A flexible armored synthetic resin hose for showers and the like, comprising:
    an extruded inner hose part of flexible material;

an extruded outer hose part of soft plastic material, the outer hose part being supported in spaced relationship from the inner hose part;

a single reinforcement helix for armoring the hose, said reinforcement helix being placed between said inner and said outer hose parts;

a helix-like hose of soft plastic material enclosing the reinforcement helix and defining a range of movement for the reinforcement helix therein, said helix-like hose being joined to the inner hose part and to the outer hose part to maintain the spaced relationship, the reinforcement helix being freely slippingly positioned within the helix-like hose, and free to slip relative to the helix-like hose and relative to the inner hose part and to the outer hose part, and wherein a free space is defined between adjacent coils of the reinforcement helix; and, a plurality of flexible, stretch-resistant reinforcement threads generally running in an axial direction and resting on an outer face of the inner hose part, such threads being at least partly joined with the outer face of the inner hose part, the axially-running reinforcement threads having outwardly running expansion folds between adjacent coils of the reinforcement helix.

13. A flexible armored synthetic resin hose for showers and the like, comprising:

an extruded inner hose part of flexible material;

an extruded outer hose part of soft plastic material, the outer hose part being supported in spaced relationship from the inner hose part;

a single reinforcement helix for armoring the hose, said reinforcement helix being placed between said inner and said outer hose parts;

a helix-like hose of soft plastic material enclosing the reinforcement helix and defining a range of movement for the reinforcement helix therein, said helix-like hose being joined to the inner hose part and to the outer hose part to maintain the spaced relationship, the reinforcement helix being freely slippingly positioned within the helix-like hose, and free to slip relative to the helix-like hose and relative to the inner hose part and to the outer hose part, and wherein a free space is defined between adjacent coils of the reinforcement helix; and, axial reinforcement threads between the inner and outer hose parts, the hose having an axial elasticity in the range of 5% to 100%, said elasticity being limited by the axial reinforcement threads.

14. A flexible armored synthetic resin hose, comprising, an inner flexible hose;

an outer flexible hose made of soft plastic, the outer hose being coaxial with the inner hose, the outer hose having a diameter larger than the inner hose, the inner and outer hoses defining an annular space;

a helical hose disposing said annular space, the helical hose being joined to the inner hose and the outer hose, the helical hose enclosing a helical space in the annular space between the inner and outer hoses, the helical hose having successive coils defining free spaces therebetween; and, a reinforcement helix loosely disposed in the helical space, the reinforcement helix armoring the hose, and the reinforcement helix being free to slip within the helical space relative to the inner and outer hoses, the outer hose and the helical hose being transparent.

15. The hose of claim 14, wherein the reinforcement helix has a substantially-rectangular cross-section, the hose further comprising a metal foil strip disposed on an outward face of said reinforcement helix.

16. The hose of claim 15, wherein the reinforcement helix is hard plastic.

17. The hose of claim 14, wherein the inner hose part is made of elastomeric material.

18. The hose of claim 14, wherein the inner hose part is made of soft plastic material.

* * * * *